(12) United States Patent
Aires et al.

(10) Patent No.: US 8,635,199 B2
(45) Date of Patent: Jan. 21, 2014

(54) SYSTEM FOR PREPARING DATA

(75) Inventors: Kevin B. Aires, Woking (GB); Ian Hughes, Southampton (GB); Darren M. Shaw, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 2306 days.

(21) Appl. No.: 10/992,489

(22) Filed: Nov. 18, 2004

(65) Prior Publication Data
US 2005/0138053 A1    Jun. 23, 2005

(30) Foreign Application Priority Data
Dec. 18, 2003 (GB) .................................. 0329281.0

(51) Int. Cl.
*G06F 7/00* (2006.01)
(52) U.S. Cl.
USPC .......................................................... 707/695
(58) Field of Classification Search
USPC .......................................................... 707/203
See application file for complete search history.

(56) References Cited

U.S. PATENT DOCUMENTS

| | | | |
|---|---|---|---|
| 5,682,441 A * | 10/1997 | Ligtenberg et al. | 382/232 |
| 6,661,775 B1 * | 12/2003 | Nakayama et al. | 370/230.1 |
| 6,745,231 B1 * | 6/2004 | Megiddo | 709/206 |
| 7,046,805 B2 * | 5/2006 | Fitzhardinge et al. | 380/212 |
| 7,171,493 B2 * | 1/2007 | Shu et al. | 709/246 |
| 2002/0012471 A1 * | 1/2002 | Nayyar | 382/239 |
| 2002/0136406 A1 * | 9/2002 | Fitzhardinge et al. | 380/210 |
| 2003/0084020 A1 * | 5/2003 | Shu | 707/1 |
| 2003/0091338 A1 * | 5/2003 | Snow et al. | 386/96 |
| 2003/0109973 A1 * | 6/2003 | Hensey et al. | 701/35 |
| 2003/0154264 A1 * | 8/2003 | Martin et al. | 709/221 |
| 2004/0133607 A1 * | 7/2004 | Miloushev et al. | 707/200 |
| 2004/0210948 A1 * | 10/2004 | Jin et al. | 725/145 |

FOREIGN PATENT DOCUMENTS

EP    0684566    11/1995

* cited by examiner

*Primary Examiner* — Apu Mofiz
*Assistant Examiner* — Thu Nga Nguyen
(74) *Attorney, Agent, or Firm* — Yudell Isidore Ng Russell PLLC

(57) ABSTRACT

A system for preparing data, operable with a server computer system having a store for a first file comprising data (e.g. audio data) and a plurality of sets of lossy data generated from the data in the first file. The system comprises a requesting component for requesting at least two sets of the plurality of sets of lossy data; a receiving component for receiving the at least two sets; and a combining component for combining the at least two sets in order to generate a second file. The data in the second file is of reduced lossiness with respect to the data in the first file.

20 Claims, 5 Drawing Sheets

US 8,635,199 B2

SYSTEM FOR PREPARING DATA

FIELD OF THE INVENTION

The present invention relates to a system for preparing data.

BACKGROUND OF THE INVENTION

In computer environments, maximising performance is a key requirement. For example, in an Internet environment, if a user is wishing to download a file, there is a need for a mechanism that prepares data so that a preview of that file can be provided. This allows a user to decide whether or not to download the file. For example, one preparing mechanism provides "thumbnails" for text files (e.g. documents), picture files (e.g. jpegs, gifs etc.) etc. A thumbnail is a miniature version of the file and provides the user with an image overview of the file. This mechanism increases performance, because it is quicker to load a plurality of thumbnails of files, than the files themselves. A user can select the thumbnail in order to view the original file.

Another preparing mechanism is available for an audio file, wherein a preview version of an audio file is prepared, the preview version comprising a small amount of the total audio data of the audio file (e.g. the first few seconds of the audio data). By downloading the preview version, a user can decide whether or not to download the audio file itself. This mechanism increases performance, because downloading the preview version is much quicker than downloading the audio file itself, as the amount of data in the preview version is smaller.

SUMMARY OF THE INVENTION

According to a first aspect, the present invention provides a system for preparing data, operable with a server computer system having a store for a first file comprising data and a plurality of sets of lossy data generated from the data in the first file, the system comprising: a requesting component for requesting at least two sets of the plurality of sets of lossy data; a first receiving component for receiving the at least two sets; and a combining component for combining the at least two sets, in order to generate a second file comprising data of reduced lossiness with respect to the data in the first file. In one embodiment, the data in the first file comprises multimedia data (e.g. audio data, video data etc.).

Preferably, the system further comprising a rendering component for rendering the second file. In one embodiment, each set of the plurality of sets of lossy data are combined in order to produce a second file comprising data of completely reduced lossiness with respect to the data in the first file.

In a preferred embodiment, the combining component further comprises means for using information associated with the at least two sets, wherein the information represents at least one of: a number of the at least two sets to be combined and identifiers associated with the at least two sets to be combined. Preferably, the combining component is invoked according to a proximity value.

Preferably, the system, further comprises a server computer system having: a lossy data generating component for reading the data in the first file and separating the data in the first file into the plurality of sets of lossy data; a second receiving component for receiving a request for the at least two sets from the system; and a sending component, in response to receiving the request, for sending the at least two sets to the system. More preferably, the server computer system further comprises a generating component for generating metadata associated with the plurality of sets of lossy data, the metadata representing at least one of: a base address, an offset, a spacing between portions of the lossy data.

According to a second aspect, the present invention provides a method of preparing data for use with a server computer system having a store for a first file comprising data and a plurality of sets of lossy data generated from the data in the first file, the method comprising the steps of: requesting at least two sets of the plurality of sets of lossy data; receiving the at least two sets; and combining the at least two sets, in order to generate a second file comprising data of reduced lossiness with respect to the data in the first file.

According to a third aspect, the present invention provides a computer program comprising program code means adapted to perform all the steps of the method described above when said program is run on a computer.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

Figure 1:
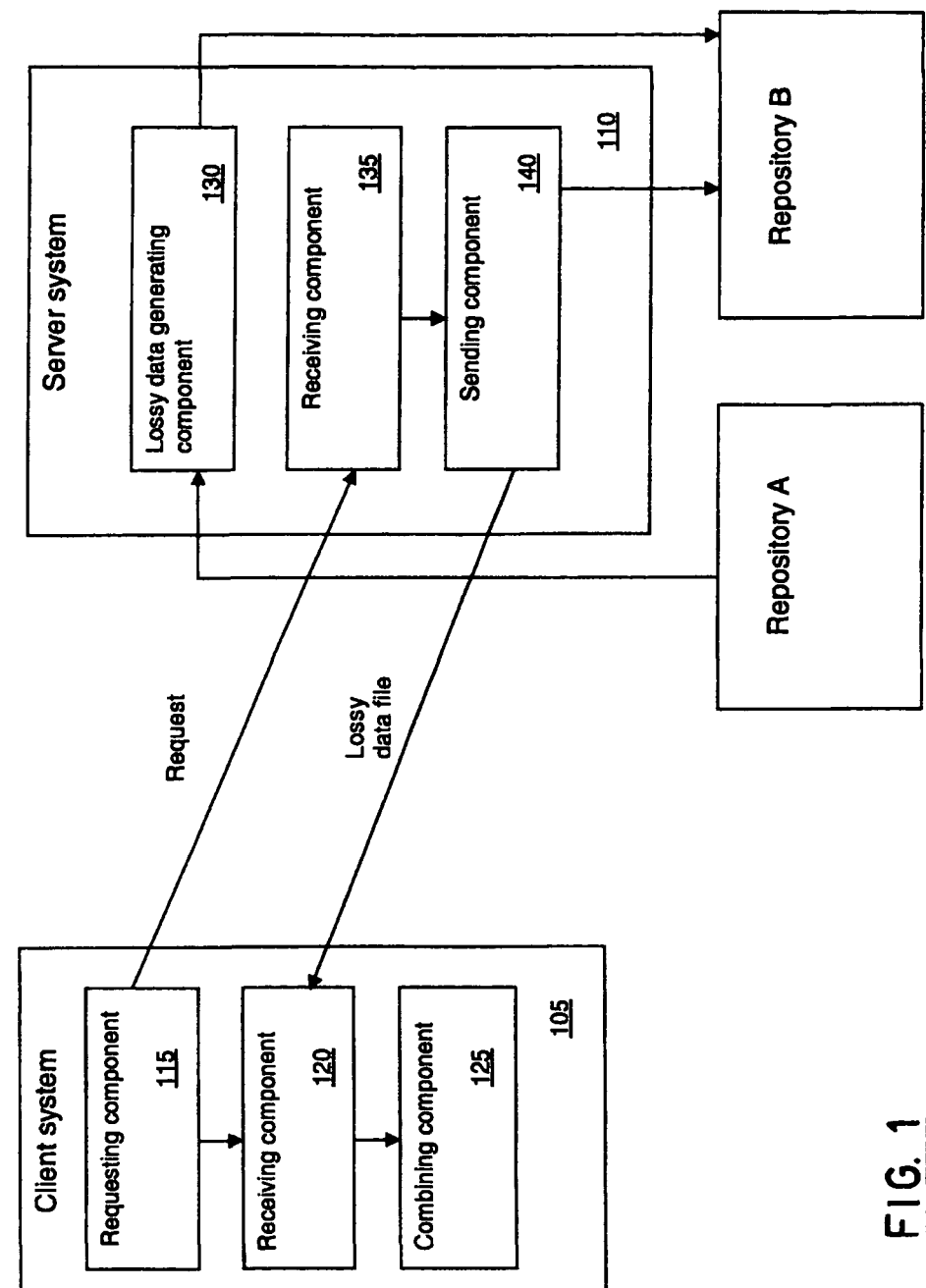
FIG. 1 is an overview of a system in which the present invention may be implemented.

An overview of one system in which the present invention may be implemented is shown in FIG. 1. The system (100) comprises a client system (105) and a server system (110).

The server system (110) comprises a lossy data generating component (130), which generates files (herein named "lossy files") that comprise lossy versions of the data of an original file stored in repository A. The lossy files are stored in repository B.

The client system (105) comprises a requesting component (115) for requesting at least two lossy files. A receiving component (135) on the server system (110) receives a request from the requesting component (115) and a sending component (140) sends the at least two lossy files, in response to receiving the request. A receiving component (120) on the client system (105) receives the at least two lossy files. A combining component (125) combines the at least two lossy files to generate a "less lossy file" comprising data of reduced lossiness with respect to the data in the at least two lossy files (and with respect to the original file). It should be understood that if all the lossy files of an original file are combined, a "lossless" file is generated, comprising data of completely reduced lossiness with respect to the data in the lossy files (and with respect to the original file).

The concept of lossy and lossless files is well known. For example, the compression algorithm JPEG is lossy so that output looks "blocky" and the compression algorithm GIF is lossless, producing a better quality image.

Figure 2:
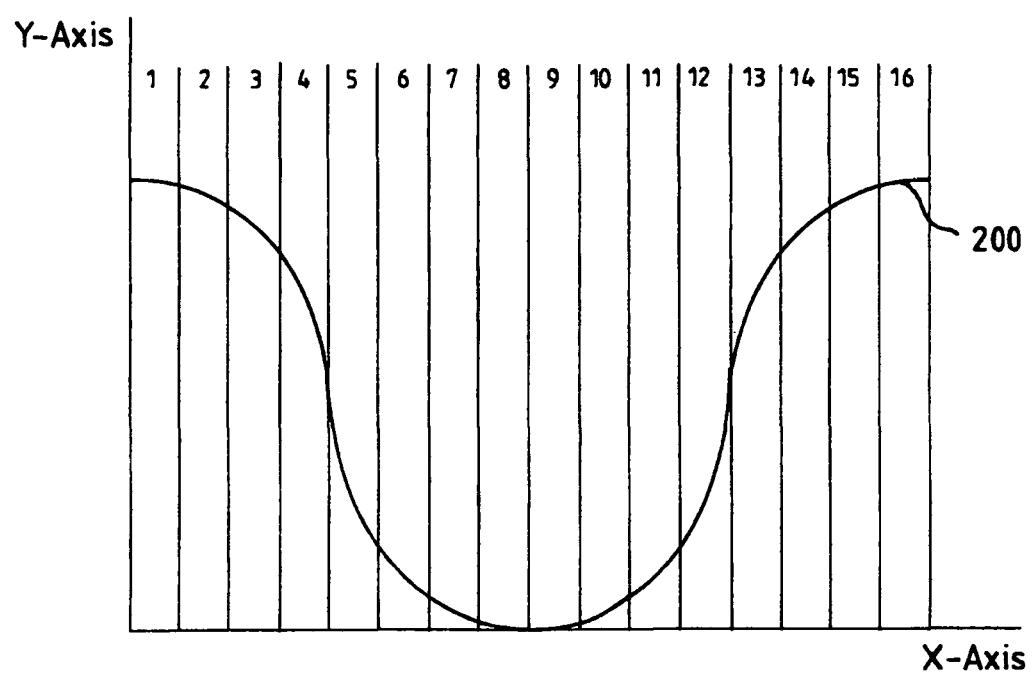
FIG. 2 shows a representation of audio data in an audio file.

The process of the present invention will now be described with reference to an audio file stored in repository A. As shown in FIG. 2, the file comprises data (i.e. a sound wave (200)). In a pre-processing phase, the lossy data generating component (130) retrieves the file from repository A and splits the data into a plurality of portions. In this example, the lossy data generating component (130) splits the sound wave (200) into sixteen equally sized portions (e.g. one byte portions).

Next, the lossy data generating component (130) distributes and stores the portions across a plurality of lossy files. In this example, portions 1, 4, 7, 10, 13 and 16 are stored in lossy file A; portions 2, 5, 8, 11, and 14 are stored in lossy file B; and portions 3, 6, 9, 12, and 15 are stored in lossy file C. It should be understood that the data in one lossy file compensates for the data lost in another lossy file.

Optionally, the server system (110) also comprises a generating component to generate metadata that is associated with each lossy file, the metadata representing the offset from the start of the original audio file and the size of the spacing between portions within the lossy file. In this example, lossy file A has metadata representing an offset of 0 and a spacing of 3, lossy file B has metadata representing an offset of 1 and a spacing of 3 and lossy file C has metadata representing an offset of 2 and a spacing of 3.

Figure 3:
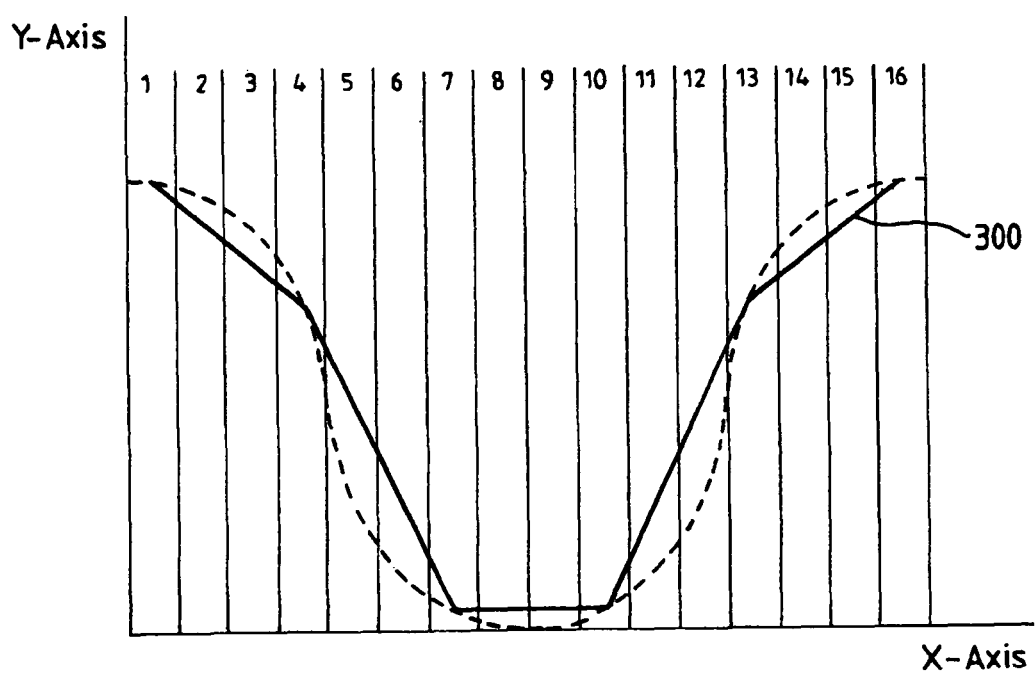
FIG. 3 shows a representation of audio data in a first lossy file.
Figure 4:
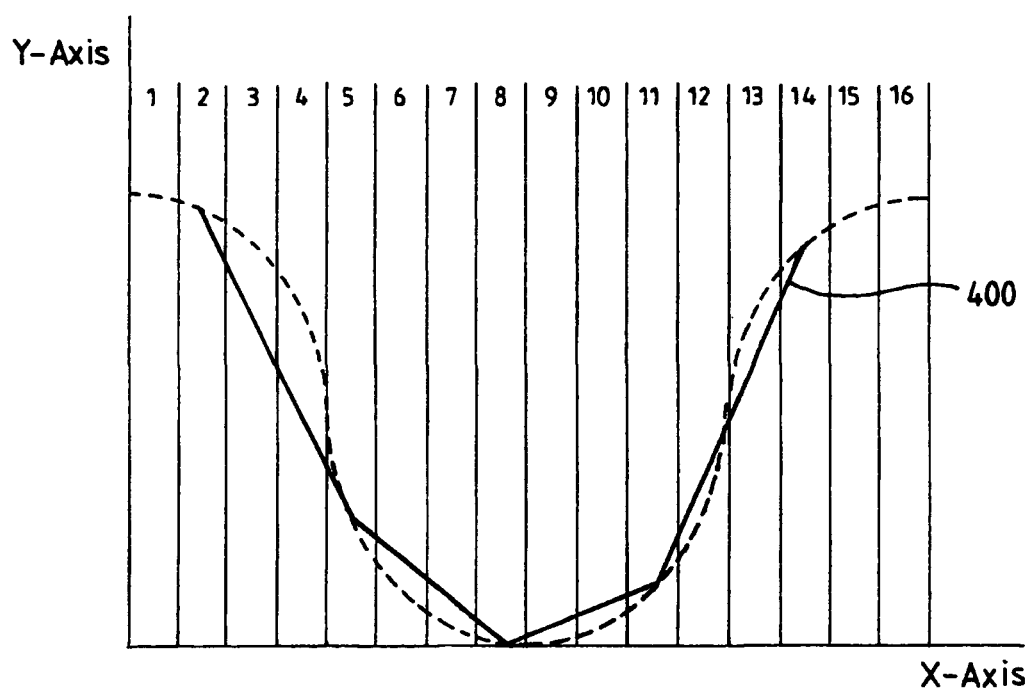
FIG. 4 shows a representation of audio data in a second lossy file.

The data in each lossy file represents a lossy version of the entire scope of the original data (i.e. the sound wave (200)). FIG. 3 shows a representation of the data in lossy file A. The sound wave (300) is a representation of the entire original sound wave, but has a lower associated quality (because of a lower amount of data). FIG. 4 shows a representation of the data in lossy file B. Again, the sound wave (400) is a representation of the entire original sound wave, but has a lower associated quality.

Next, the lossy data generating component (130) stores the lossy files in repository B. Optionally, the server system (110) now displays icons representing the lossy files and also optionally, an icon representing the original file. Next, a user at the client system (105) sends a request, via the requesting component (115), to the receiving component (135) for a lossy version of the file (e.g. by clicking on an icon representing the lossy file A). In response to the request, the sending component (140) retrieves the lossy file (i.e. lossy file A) from repository B and sends the lossy file to the receiving component (120) on the client system (105).

Optionally, the sending component (140) comprises a load balancing component that can load balance between the multiple lossy files. For example, if a first user and a second user request lossy files from the same original, the load balancing component sends a first lossy file to the first user and a second lossy file to the second user. Thus advantageously, the load balancing component avoids the need to serialize file access (e.g. by using locking mechanism etc.). It is well known that files comprising data such as audio data or image data are large and therefore a reduction in file access time is advantageous.

Optionally, after the lossy file A is received at the receiving component (120) on the client system (105), it is rendered on the client system (e.g. using a rendering component). Upon rendering, the user hears the entire scope of the sound wave, but a low quality representation of the sound wave.

If the user decides to continue with processing, the user sends another request via the requesting component (115) to the receiving component (135) for another lossy file. In one embodiment, the request comprises a request for one other lossy file (e.g. lossy file B). In another embodiment, the request comprises a request for more than one other lossy file (e.g. lossy file B and lossy file C).

In this first example, the request comprises a request for one other lossy file (i.e. lossy file B). In response to the request, the sending component (140) retrieves the lossy file (i.e. lossy file B) from repository B and sends the lossy file to the receiving component (120) on the client system (105). Optionally, lossy file B is rendered on the client system (105).

Next, the combining component (125) combines the lossy files A and B to produce a file comprising a less lossy version of the data of the original file (i.e. a less lossy file D). In one embodiment, the combining component (125) uses the offset and spacing metadata associated with the lossy files to correctly position the data in the lossy files into the less lossy file. For example, the data in lossy file A is positioned at the start of the less lossy file D, with a spacing of 3 and the data in lossy file B is positioned at an offset of 1 from the start of the less lossy file D, with a spacing of 3.

Figure 5:
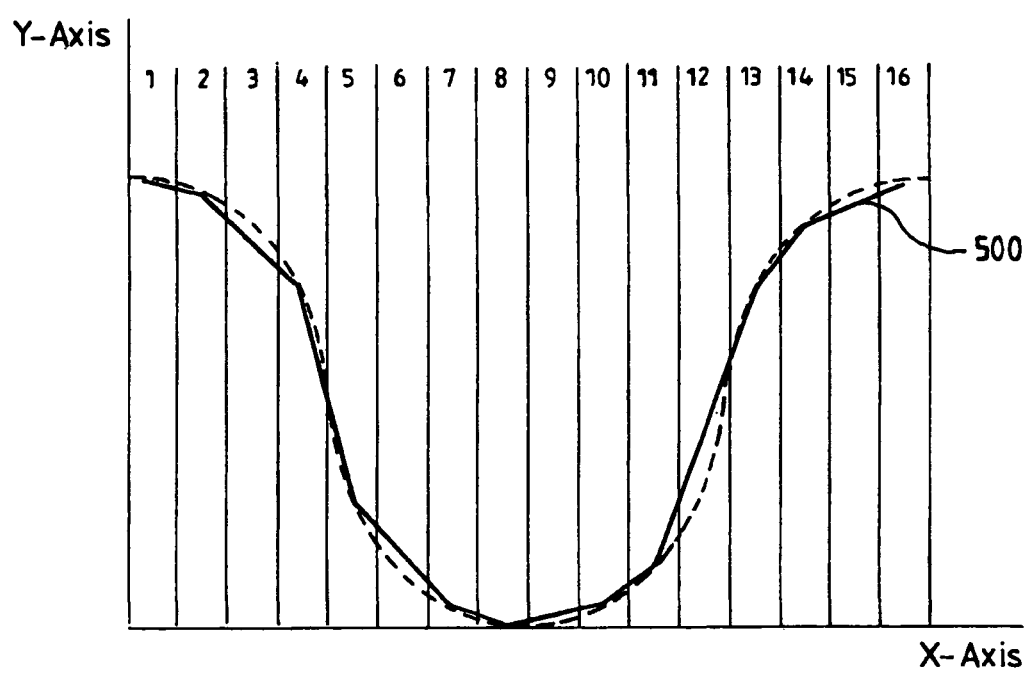
FIG. 5 shows a representation of audio data in a less lossy file, generated by combining the first lossy file and the second lossy file.

Less lossy file D comprises portions 1, 2, 4, 5, 7, 8, 10, 11, 13, 14 and 16. The sound wave represented by the portions is shown in FIG. 5. It should be understood that the sound wave (500) in FIG. 5 is of a higher quality than the sound wave (300) in FIG. 3 or the sound wave (400) in FIG. 4, because the sound wave (500) comprises more data portions. However, the sound wave (500) is of a lower quality than the sound wave (200) of the original audio file.

In a second example, the request comprises a request for two other lossy files (i.e. lossy file B and lossy file C). In response to the request, the sending component (140) retrieves the lossy files (i.e. lossy file B and lossy file C) from repository B and sends the lossy files to the receiving component (120) on the client system (105). Optionally, lossy file B and/or lossy file C is rendered on the client system (105).

In response to receiving the request, the combining component (125) uses the lossy files A, B and C and combines them to produce a file comprising a lossless version of data of the original file (i.e. a lossless file E). In one embodiment, the combining component (125) uses the offset and spacing metadata associated with the lossy files to correctly position the data in the lossy files into the lossless file. For example, the data in lossy file A is positioned at the start of the lossless file E, with a spacing of 3. The data in lossy file B is positioned at an offset of 1 from the start of the lossless file E, with a spacing of 3. The data in lossy file C is positioned at an offset of 2 from the start of the lossless file E, with a spacing of 3.

The lossless file E comprises portions 1, 2, 3, 4, 5, 6, 7, 8, 9, 10, 11, 12, 13, 14, 15 and 16. The sound wave represented by the portions is shown in FIG. 2. Thus, the sound wave in lossless file E is the same as the sound wave in the original audio file in repository A.

In one embodiment, the combining component (125) uses pre-configured (e.g. set by a user) information associated with the lossy files. In one example, the information represents the number of lossy files to be combined by the combining component (125). In another example, the information represents identifiers, which identify the lossy files that are to be combined by the combining component (125).

Advantageously, by combining a lossy file that exists on the client system (105) with another lossy file that is transmitted from the server system (110), the present invention provides an efficient system of reducing the amount of bandwidth needed on the second or subsequent transmission.

The present invention can be used in several applications. In one application, the combining component on a client system is invoked in response to the proximity of another client system. For example, a first user at a first client system (e.g. a personal digital assistant (PDA)) requests a first lossy file from a server and a second user at a second client system (e.g. a mobile telephone) requests a second lossy file from the server. When the client systems move into proximity of each other (e.g. within a pre-determined proximity), in one embodiment, the sending component on the first client system sends the first lossy file to the second client system and the sending component on the second client system sends the second lossy file to the first client system. Next, the combining component on the first client system combines the first and second lossy files and the combining component on the second client system combines the first and second lossy files. Therefore a less lossy file (or a lossless file) is generated on the first and second client systems.

In another application, each lossy file has an associated monetary value and the number of lossy files that a user downloads depends on the price that the user wishes to pay. In yet another application, the present invention is applied to other types of digital files (e.g. an image file, a video file, a text file etc.).

It should be understood that the data in each lossy file represents the full scope of the original data, but the data in each lossy file is of a lower quality (e.g. less detail, lower resolution etc.) than the original data. Therefore, each lossy file is a stand alone, fully functioning file. However, two or more lossy files can be combined in order to generate a less lossy version of the data that is of a higher quality than the data in each of the two or more lossy files but of lower quality than the original data. In another embodiment, two or more lossy files can be combined in order to generate a lossless version of the data that is of a higher quality than the data in each of the two or more lossy files and the same quality as the original data.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

The invention claimed is:

1. A system for preparing data, operable with a server computer system having a store for a first file comprising data and a plurality of sets of lossy data generated from the data in the first file, the system comprising:
    a requesting component for requesting at least two sets of the plurality of sets of lossy data, wherein each of the plurality of sets of lossy data is a stand alone, fully functioning file, providing a lossy version of the first file;
    a first receiving component for receiving the at least two sets; and
    a combining component for combining the at least two sets of lossy data, in order to generate a second file comprising data of reduced lossiness with respect to the data in the first file, wherein, when only two sets of lossy data are initially generated from the first file, said combining provides a lossless recreation of the first file.

2. A system as claimed in claim 1, further comprising a rendering component for rendering the second file.

3. A system as claimed in claim 1, wherein each set of the plurality of sets of lossy data are combined using metadata within the sets of lossy data from among a base address, an offset, and a spacing between portions of the lossy data, said offset and spacing metadata being utilized by the combining component to correctly position data in the two sets of lossy data relative to each other to generate the less lossy second file.

4. A system as claimed in claim 1, wherein the combining component further comprises means for using information associated with the plurality of sets, wherein the information represents at least one of: a number of the plurality of sets to be combined and identifiers associated with the sets from among the plurality of sets to be combined.

5. A system as claimed in claim 1, wherein the data in the first file comprises multimedia data and each set of lossy data represents a lossy version of the entire scope of original data within the first file with a lower associated quality and combining the two sets of lossy data provides a higher quality representation of the first file.

6. A system as claimed in claim 1, wherein the combining component is invoked in response to a proximity of a second client system, wherein when the client system and the second client system, which have received different ones of the sets of lossy data, move into a communication proximity of each other:
    a sending component of the client system sends the second file to the second client system and receives one or more different lossy files from the second client system; and
    the combining component combines the received one or more different lossy files with the second file to generate a third file that is less lossy than the second file.

7. A system as claimed in claim 1, further comprising: a server computer system having:
    a lossy data generating component for reading the data in the first file and separating the data in the first file into the plurality of sets of lossy data;
    a second receiving component for receiving a request for the at least two sets from the system; and
    a sending component, in response to receiving the request, for sending the at least two sets to the system.

8. A system as claimed in claim 7, wherein the server computer system further comprises a generating component for generating metadata associated with the plurality of sets of lossy data, the metadata representing at least one of a base address, an offset, a spacing between portions of the lossy data, wherein said metadata is transferred within the at least two sets of lossy data during said sending and is utilized to correctly combine the two sets of lossy data.

9. A method of preparing data for use with a server computer system having a store for a first file comprising data and a plurality of sets of lossy data generated from the data in the first file, the method comprising the steps of:
    requesting at least two sets of the plurality of sets of lossy data generated from the data of the first file, wherein each of the plurality of sets of lossy data is a stand alone, fully functioning file, providing a lossy version of the first file;
    receiving the at least two sets; and combining the at least two sets, in order to generate a second file comprising data of reduced lossiness with respect to the data in the first file;

wherein when said requesting includes subsequently requesting a next set of lossy data while at least one existing set of lossy data exists on the client system, said combining combines the next set of lossy data with the existing set of lossy data, wherein when at least two previously received sets are combined as the second file on the client system, said combining component combines the next set of lossy data to the second file to generate a third, even less lossy file than the second file.

10. A computer program product comprising;

a non-transitory computer readable medium; and program code on the non-transitory computer readable medium adapted to perform the following functions when said program code is run on a computer:

requesting at least two sets of the plurality of sets of lossy data generated from data in a first file, wherein each of the plurality of sets of lossy data is a stand alone, fully functioning file, providing a lossy version of the first file;

receiving the at least two sets; and combining the at least two sets, in order to generate a second file comprising data of reduced lossiness with respect to the data in the first file, said combining provided to prepare data for use with a server computer system having a store for the first file;

wherein when said requesting includes subsequently requesting a next set of lossy data while at least one existing set of lossy data exists on the client system, said combining combines the next set of lossy data with the existing set of lossy data, wherein when at least two previously received sets are combined as the second file on the client system, said combining component combines the next set of lossy data to the second file to generate a third, even less lossy file than the second file.

11. A computer program product as claimed in claim 10, wherein:

each set of the plurality of sets of lossy data are combined using metadata within the sets of lossy data from among a base address, an offset, and a spacing between portions of the lossy data, said offset and spacing metadata being utilized by the combining to correctly position data in the two sets of lossy data relative to each other to generate the less lossy second file; and said code for combining utilizes information associated with the plurality of sets, wherein the information represents at least one of: a number of the plurality of sets to be combined and identifiers associated with the sets from among the plurality of sets to be combined.

12. A computer program product as claimed in claim 10, wherein the data in the first file comprises multimedia data and each set of lossy data represents a lossy version of the entire scope of original data within the first file with a lower associated quality and said code for combining the two sets of lossy data provides a higher quality representation of the first file.

13. A computer program product as claimed in claim 10, wherein:

the combining is invoked in response to a proximity of a second client system, wherein, when the client system and the second client system, which have received different ones of the sets of lossy data, move into a communication proximity of each other, said program code further comprises code for:

sending the second file to the second client system;

receiving one or more different lossy files from the second client system; and combining the received one or more different lossy files with the second file to generate a third file that is less lossy than the second file.

14. A method as claimed in claim 9, wherein:

each set of the plurality of sets of lossy data are combined using metadata within the sets of lossy data from among a base address, an offset, and a spacing between portions of the lossy data, said offset and spacing metadata being utilized by the combining to correctly position data in the two sets of lossy data relative to each other to generate the less lossy second file; and said combining utilizes information associated with the plurality of sets, wherein the information represents at least one of: a number of the plurality of sets to be combined and identifiers associated with the sets from among the plurality of sets to be combined.

15. A method as claimed in claim 9, wherein the data in the first file comprises multimedia data and each set of lossy data represents a lossy version of the entire scope of original data within the first file with a lower associated quality and combining the two sets of lossy data provides a higher quality representation of the first file.

16. A method as claimed in claim 9, wherein:

the combining is invoked in response to a proximity of a second client system, wherein, when the client system and the second client system, which have received different ones of the sets of lossy data, move into a communication proximity of each other, said method further comprises:

sending the second file to the second client system;

receiving one or more different lossy files from the second client system; and combining the received one or more different lossy files with the second file to generate a third file that is less lossy than the second file.

17. A system as claimed in claim 1, wherein:

said receiving component stores each received set of lossy data; and when said requesting component subsequently requests a next set of lossy data while at least one existing set of lossy data exists on the client system, said combining component combines the next set of lossy data with the existing set of lossy data, wherein when the at least two previously received sets are combined as the second file on the client system, said combining component combines the next set of lossy data to the second file to generate a third, even less lossy file than the second file.

18. A system as claimed in claim 7, wherein:

the lossy data generating component of the server computer system generates and displays icons representing the sets of lossy data;

the second receiving component detects a selection of one or more of the icons representing specific ones of the sets of lossy data, retrieves the one or more sets of lossy data whose icons are selected and semis the one or more sets to a client system from which the one or more icons are selected.

19. A system as claimed in claim 7, wherein:

the lossy data generating component of the server computer system generates and displays an icon representing the first file; and the second receiving component detects a selection of the icon representing the first file, retrieves the first file, and sends the first file to the client system.

20. A system as claimed in claim 7, wherein said server further comprises:

a load balancing component that balances a distribution of the plurality of sets of lossy data among multiple requesting clients, wherein multiple requests for a lossy file receive a different one of the lossy sets of data to avoid serialization of file access to the sets of lossy data.

\* \* \* \* \*